United States Patent
Chang et al.

(10) Patent No.: US 9,218,121 B2
(45) Date of Patent: Dec. 22, 2015

(54) APPARATUS AND METHOD RECOGNIZING TOUCH GESTURE

(75) Inventors: Wook Chang, Seoul (KR); Joon-ah Park, Seoul (KR); Seung-ju Han, Seoul (KR); Hyun-jeong Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1112 days.

(21) Appl. No.: 12/659,942

(22) Filed: Mar. 25, 2010

(65) Prior Publication Data

US 2010/0259493 A1 Oct. 14, 2010

(30) Foreign Application Priority Data

Mar. 27, 2009 (KR) .................. 10-2009-0026615

(51) Int. Cl.
*G06F 3/041* (2006.01)
*G06F 3/0488* (2013.01)

(52) U.S. Cl.
CPC .......... *G06F 3/04883* (2013.01); *G06F 3/0418* (2013.01); *G06F 3/041* (2013.01); *G06F 3/0488* (2013.01); *G06F 2203/04104* (2013.01); *G06F 2203/04106* (2013.01)

(58) Field of Classification Search
USPC ...................................................... 345/173
See application file for complete search history.

(56) References Cited

U.S. PATENT DOCUMENTS

| | | | | |
|---|---|---|---|---|
| 7,519,223 | B2* | 4/2009 | Dehlin et al. | 382/203 |
| 7,737,958 | B2 | 6/2010 | Jeon et al. | |
| 7,782,308 | B2 | 8/2010 | Shin et al. | |
| 2006/0061543 | A1* | 3/2006 | Hamano et al. | 345/156 |
| 2006/0122769 | A1* | 6/2006 | Hotehama | 701/209 |
| 2007/0046643 | A1* | 3/2007 | Hillis et al. | 345/173 |
| 2008/0158145 | A1 | 7/2008 | Westerman | |
| 2008/0168403 | A1* | 7/2008 | Westerman et al. | 715/863 |
| 2009/0128516 | A1* | 5/2009 | Rimon et al. | 345/174 |
| 2011/0179381 | A1* | 7/2011 | King | 715/786 |
| 2011/0205169 | A1* | 8/2011 | Yasutake | 345/173 |

FOREIGN PATENT DOCUMENTS

KR 10-2007-0113017 A 11/2007

OTHER PUBLICATIONS

Korean Office Action issued on Aug. 21, 2015 in counterpart Korean Application No. 10-2009-0026615 (8 pages with English translation).

* cited by examiner

*Primary Examiner* — Linh H Hoffner
(74) *Attorney, Agent, or Firm* — NSIP Law

(57) ABSTRACT

Disclosed are a touch gesture recognition apparatus and method that can be, or applied to, both a single-touch system and a multi-touch system. The touch gesture recognition method recognizes touch gestures using the diagonal-line length of a bounding box created based on touch location information and variations in the diagonal-line length. After a gesture is recognized, the recognized gesture is mapped to an input event of a user input device and feedback according to the input event is provided.

20 Claims, 7 Drawing Sheets

● REAL TOUCH LOCATION
○ VIRTUAL TOUCH LOATION

APPARATUS AND METHOD RECOGNIZING TOUCH GESTURE

CROSS-REFERENCE TO RELATED APPLICATIONS

This application claims the benefit under 35 U.S.C. §119(a) of Korean Patent Application No. 10-2009-0026615, filed on Mar. 27, 2009, the disclosure of which is incorporated by reference in its entirety for all purposes.

BACKGROUND

1. Field

One or more embodiments of the following description relate to a touch gesture recognition apparatus and method, and more particularly, to a touch gesture recognition apparatus and method that can recognize touch gestures with a small amount of calculations.

2. Description of the Related Art

Existing touch screens or touch pads do not provide users with various interactions such as multi-touch interaction to users since they use only information related to single-touch interaction. For this reason, products such as Apple iPhone™, MS Surface™, etc., have proposed more intuitive user interfaces based on multi-touch approaches.

In order to implement an interface to recognize multi-touch gestures, a touch sensor system has to accurately detect touch points. However, a multi-touch gesture recognition system generally is costly and takes up a large amount of space and also requires large amounts of computing power for gesture recognition, including type of gesture, since a complicated image processing technology is generally needed to recognize a multi-touch gesture. Furthermore, existing system OSs or application programs should be modified to be suitable for a multi-touch interaction method.

SUMMARY

One or more embodiments of the following description relate to a touch gesture recognition apparatus and method which can reduce the amount of calculations required for touch recognition and can be applied as or to a multi-touch system as well as a single-touch system.

In one or more embodiments, there is provided a touch gesture recognition apparatus. In order to recognize a gesture, the gesture recognition apparatus defines a bounding box surrounding a location where a touch occurs and recognizes a gesture based on a determined length of a diagonal line of the bounding box. The recognized gesture is mapped to a user input event of a user input unit of the touch gesture recognition apparatus, and operation corresponding to the mapped user input event may be executed. The executed result may be displayed on a screen of the touch gesture recognition apparatus.

The length of the diagonal line is calculated as a distance between a minimal point having a smallest x-axis value and a smallest y-axis value and a maximal point having a greatest x-axis value and a greatest y-axis value on a 2-dimensional coordinate system within the location where the touch occurs. The touch gesture recognition apparatus recognizes the gesture using a determined variation in the diagonal line length in addition to using the diagonal line length.

The touch gesture recognition apparatus recognizes, when the diagonal-line length is determined to be less than a threshold diagonal-line length for single-touch, the gesture as a single-touch gesture. The touch gesture recognition apparatus recognizes, when the diagonal-line length is determined to be longer than the threshold diagonal-line length for single-touch and less than a threshold diagonal-line length for multi-touch which is longer than the threshold diagonal-line length for single-touch, the gesture as a multi-touch gesture. When recognizing the gesture as one of a single-touch gesture and a multi-touch gesture, the touch gesture recognition apparatus determines whether a determined variation in a location of a center point of the bounding box exceeds a predetermined threshold value, and recognizes the gesture as one of a single-touch scroll and a multi-touch scroll if the determined variation in the location of the center point of the bounding box exceeds the predetermined threshold value.

The touch gesture recognition apparatus recognizes the gesture as a 2-finger pinching gesture when a determined variation in the diagonal-line length of the bounding box exceeds a first threshold change amount. The touch gesture recognition apparatus recognizes the gesture as a spreading in and out gesture when the diagonal-line length is determined to be longer than a threshold diagonal-line length for multi-touch and a determined variation in the diagonal-line length of the bounding box exceeds a second threshold change amount.

The touch gesture recognizing apparatus creates the bounding box based on touch location information collected for an initial determination time for gesture recognition, and recognizes the gesture using the diagonal-line length of the bounding box. The touch gesture recognition apparatus maintains the gesture recognized based on the touch location information collected for the initial determination time for gesture recognition, until it is determined that the touch has been released as the touch is not detected for a time longer than a threshold touch release time. The touch gesture recognition apparatus recognizes the gesture as a spreading in and out gesture when the diagonal-line length of the bounding box is determined to be longer than the threshold diagonal-line length for multi-touch which is a reference value to determine a multi-touch gesture when the initial determination time has not elapsed.

The user input event may be at least one input event of a pressing of a left mouse button, pressing of a right mouse button, moving of a mouse cursor, rotation of a scroll wheel, release of a left mouse button, and release of a right button.

In one or more embodiments, there is provided a touch gesture recognition method including recognizing a touch, creating a bounding box surrounding a location where the touch occurs and recognizing a gesture based on a length of a diagonal line of the bounding box, and mapping the recognized gesture to a user input event.

Additional aspects and/or advantages will be set forth in part in the description which follows and, in part, will be apparent from the description, or may be learned by practice of the invention.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION

Figure 1:
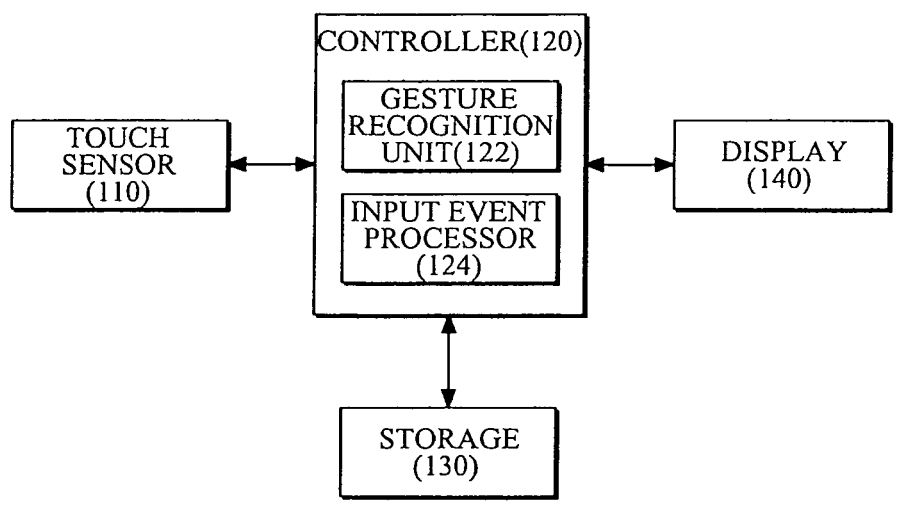
FIG. 1 is a block diagram illustrating a touch gesture recognition apparatus, according to one or more embodiments.

Reference will now be made in detail to embodiments, examples of which are illustrated in the accompanying drawings, wherein like reference numerals refer to like elements throughout. In this regard, embodiments of the present invention may be embodied in many different forms and should not be construed as being limited to embodiments set forth herein. Accordingly, embodiments are merely described below, by referring to the figures, to explain aspects of the present invention.

FIG. 1 is a block diagram illustrating a touch gesture recognition apparatus 100, according to one or more embodiments.

The touch gesture recognition apparatus 100 includes a touch sensor 110, a controller 120, a storage 130, and a display 140. The touch gesture recognition apparatus 100 may be implemented as or in various pieces of equipment, such as a mobile phone, a Personal Digital Assistant (PDA), a Portable Multimedia Player (PMP), or a large-sized display, etc., where touch gestures can be utilized.

The touch sensor 110 may include one or more different types of sensors to generate sensing information. The touch sensor 110 may be a lattice type sensor where electrodes are arranged in x-axis and y-axis directions to form a lattice structure. When a user contacts the touch sensor 110 with his/her hand or finger, the touch sensor 110 may detect an area or location at which the touch occurs by detecting a change in signal intensity due to the touching of the electrode. For example, the touch sensor 110 may operate based on a projected capacitive touch technology or an infrared touch technology.

The controller 120 controls the general operation of the gesture recognition apparatus 100, and creates a user interface screen to display interactions which respond to information input by a user. The controller 120 may include a gesture recognizer 122 and an input event processor 124.

According to one or more embodiments, the gesture recognizer 122 defines a bounding box surrounding the detected area, and recognizes the user's gesture based on the length of a diagonal line of the bounding box. The gesture recognizer 122 may recognize the user's gesture using variations in diagonal-line lengths of bounding boxes as well as using the diagonal line length. The variations can be calculated by collecting the diagonal-line lengths of bounding boxes for a predetermined duration.

The input event processor 124 maps the recognized gesture to a user input event, such as an already existing event of an alternative input device. For example, if an existing OS can process mouse events, the user input event may correspond to a mouse input event. In this case, the input event processor 124 may map the recognized gesture to at least one input event among a pressing of left mouse button, pressing of right mouse button, moving of mouse cursor, rotation of scroll wheel, release of left mouse button, and release of right mouse button.

The below Table 1, for example, is a table which shows a mapping relationship between touch gestures and mouse events.

TABLE 1

| Touch Gesture | Mouse Event |
| --- | --- |
| Single-Touch | Pressing of Left Mouse Button |
| Multi-Touch | Pressing of Right Mouse Button |
| Move | Moving of Mouse Cursor |
| 2 Finger Pinching & Spreading In and Out | Rotation of Scroll Wheel |
| Touch Release | Release of Left/Right Mouse Button |

In other words, the recognized gesture can be converted into a mouse event with reference to Table 1 which defines the mapping relationship between touch gestures and mouse events.

If the corresponding OS can process keyboard input events, the user input event may be a keyboard input event. In this case, the input event processor 124 may map the recognized gesture to an input event processable by the existing OS, using the mapping information between predetermined touch gestures and user input events, similar to that shown in Table 1. In this way, if the user's gesture is recognized, interaction between the user and the touch gesture recognition apparatus 100 can be done based on the recognized gesture without having to modify the existing OS and application programs.

The storage 130 stores data, OS programs, and application programs to drive the touch gesture recognition apparatus 100. The storage 130 may store a touch gesture recognition algorithm which is executed by the controller 120, and input event mapping information regarding the mapping relationship between recognized gestures and input events of an input device.

The display 140 outputs the results of executions by the controller 120. The display 140 may display the execution result of the input event mapped by the input event processor 124 on a user interface screen. The touch sensor 110 and display 140 may be integrated into a touch screen.

Hereinafter, a touch gesture recognition method, according to one or more embodiments will be described in greater detail.

Figure 2:
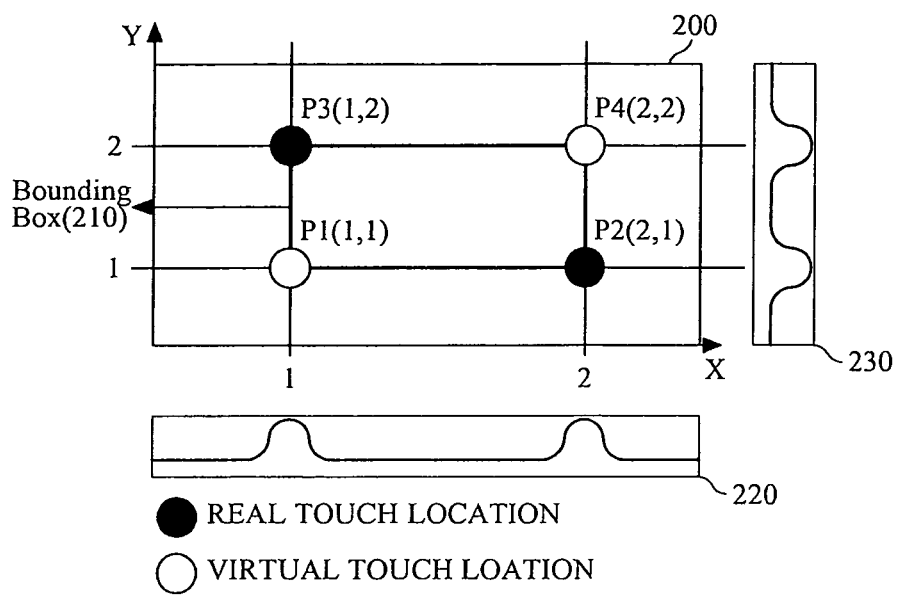
FIG. 2 is a view showing signals generated when a user touches a touch screen with two fingers, according to one or more embodiments.

FIG. 2 is a view showing signals generated when a user touches a touch screen with two fingers, according to one or more embodiments.

FIG. 2 shows a touch screen (or a touch pad) 200, an X-axis touch signal 220 representing a touch which has occurred in the X-axis direction on the touch screen 200 and a Y-axis touch signal 230 representing a touch which has occurred in the Y-axis direction on the touch screen 200. In FIG. 2, it is assumed that two fingers touch two locations P2(1, 2) and P3(2, 1) on the touch screen 200.

A conventional single-touch screen senses touch signals on its X-axis and Y-axis coordinates. In other words, X-axis and Y-axis locations such as X=(1, 2) and Y=(1, 2) are respectively determined, and then final 2-dimensional touch locations are determined. Accordingly, in this case, the single-touch screen obtains virtual touch locations P1 and P4 as well as the actual touch locations P2 and P3, and thus finally obtains four touch locations P1(1, 1), P2(2, 1), P3(1, 2) and P4(2, 2). Meanwhile, a multi-touch screen detects 2-dimensional touch points directly and accordingly can determine accurate touch locations P2 and P3.

In other words, a single-touch screen/pad provides X-axis and Y-axis projection locations as final outputs, whereas a multi-touch screen/pad provides 2-dimensional touch points as final outputs. Accordingly, a single-touch type touch screen and a multi-touch type touch screen have to use different touch gesture recognition algorithms, and thus the present inventors have found that development of a new touch recognition technology is desirable.

The touch gesture recognition apparatus 100 performs such a desirable gesture recognition, as only an example, using a bounding box 210 created by touch points.

Figure 3:
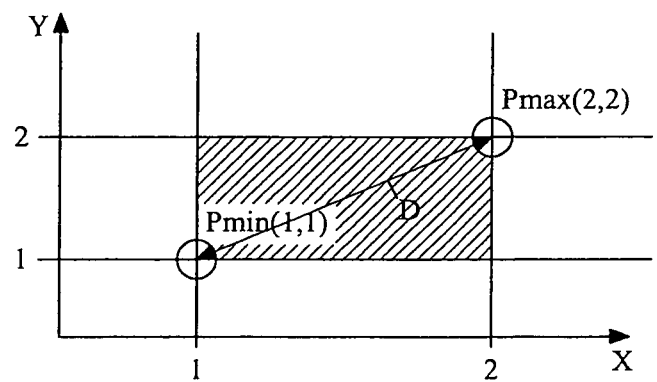
FIG. 3 is a view showing parameters to create a bounding box, according to one or more embodiments.

FIG. 3 is a view showing parameters to create a bounding box, according to one or more embodiments.

Methods for creating a bounding box can vary. According to one or more embodiments, a point Pmin having the smallest X and Y coordinate values and a point Pmax having the greatest X and Y coordinate values, among four corner values, are used to create a bounding box. The points Pmin and Pmax are values that can be obtained by a single-touch screen as well as a multi-touch screen. The X- and Y-axis coordinate values may be measured from two edges of the touch screen.

The gesture recognition unit 122 detects a minimum point Pmin having the smallest X-axis and Y-axis coordinate values and a maximum point Pmax having the greatest X-axis and Y-axis coordinate values on a 2-dimensional coordinate system in at least one touch location, and calculates the distance between the Pmin and Pmax as a diagonal length D of a bounding box. The diagonal length D can be calculated by using the below Equation 1, for example.

$$D = \mathrm{sqrt}((x\max - x\min)2 + (y\max - y\min)2) \quad \text{Equation 1:}$$

Here, xmax represents the X coordinate value of the maximum point Pmax, ymax represents the Y coordinate value of the maximum point Pmax, xmin represents the X coordinate value of the minimum point Pmin, and ymin represents the Y coordinate value of the minimum point Pmin.

Now, the relationship between D values and corresponding touch gestures will be described with reference to FIGS. 4A through 4D below.

FIGS. 4A through 4D are views showing a relationship between touch gestures and bounding boxes, according to one or more embodiments.

Figure 4A:
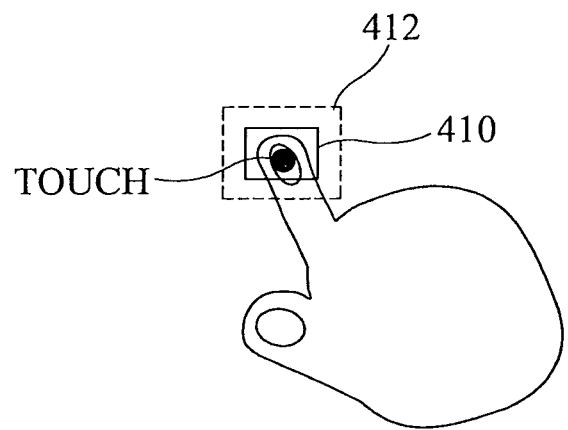
FIGS. 4A through 4D are views showing relationships between touch gestures and bounding boxes, according to one or more embodiments.
Figure 4B:
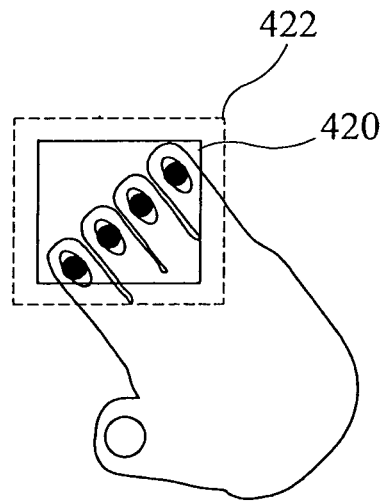
Figure 4C:
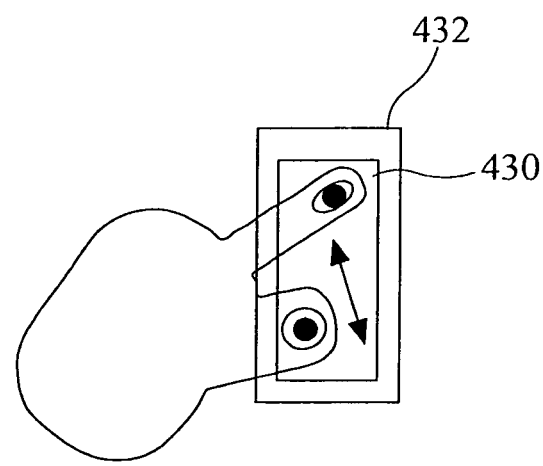
Figure 4D:
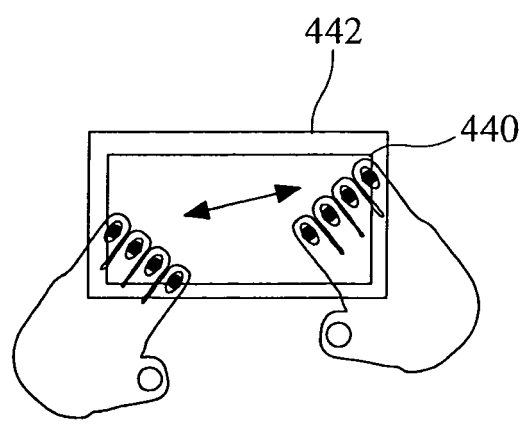

FIG. 4A shows bounding boxes 410 and 412 for a single-touch gesture, FIG. 4B shows bounding boxes 420 and 422 for a multi-touch gesture, FIG. 4C shows bounding boxes 430 and 432 for a multi-touch gesture (2 finger pinching) and FIG. 4D shows bounding boxes 440 and 442 for a spreading in and out gesture taken with multiple fingers or two hands.

Hereinafter, a method of recognizing gestures using bounding boxes, according to one or more embodiments, will be described in detail with reference to the below Table 2, for example.

TABLE 2

| Single-Touch Scroll | $D < D_{th1}, |P_B| > P_B^{th1}$ |
| Multi-Touch Scroll | $D_{th1} \leq D \leq D_{th2}, |P_B| > P_B^{th2}$ |
| 2 Finger Pinching | $|\Delta D| > \Delta D_{th1}$ |
| Spreading In and Out | $D > D_{th2}, |\Delta D| > \Delta D_{th2}$ |

Referring to FIGS. 1 and 4A through 4D, the gesture recognition unit 122 recognizes, if the diagonal length D of a bounding box is less than a threshold diagonal-line value $D_{th1}$ for single-touch, the corresponding gesture as a single-touch gesture.

If the diagonal length D of the bounding box is greater than the threshold diagonal-line value $D_{th1}$ for single-touch and is less than a threshold diagonal-line value $D_{th2}$ for multi-touch, the gesture recognition unit 122 recognizes the gesture as a multi-touch gesture. In FIG. 4A, the bounding box 412 represented by dotted lines is a threshold bounding box for single-touch, which is reference of the threshold diagonal-line value $D_{th1}$ for single-touch, and in FIG. 4B, the bounding box 422 represented by dotted lines is a threshold bounding box for multi-touch, which is reference of the threshold diagonal-line value $D_{th2}$ for multi-touch.

When the gesture recognition unit 122 recognizes the gesture as a single-touch gesture, the gesture recognition unit 122 may recognize, if a variation in the location $P_B$ of the center point of the bounding box exceeds a first threshold value $P_B^{th1}$, the gesture as a single-touch scroll gesture. When the gesture recognition unit 122 recognizes the gesture as a multi-touch gesture, the gesture recognition unit 122 may recognize, if a variation in the location $P_B$ of the center point of the bounding box exceeds a second threshold value $P_B^{th2}$, the gesture as a multi-touch scroll gesture.

In Table 1, $\Delta D$ means $D(t)-D(t-1)$, that is, a variation of a D value over time. In this respect, if a variation $\Delta D$ in the diagonal-line of a bounding box exceeds a first threshold variation value $\Delta D_{th1}$, the gesture recognition unit 122 may recognize the gesture as a 2 finger pinching gesture. In addition, the gesture recognition unit 122 may further determine whether the variation of the center point of the bounding box is less than a predetermined threshold variation value to improve accuracy of the gesture recognition, and recognize the gesture as a 2 finger pinching gesture if the change is less than the predetermined threshold variation value. In FIG. 4C, a bounding box 430 represents a bounding box corresponding to a touch gesture at a time t, and a bounding box 432 represents a bounding box corresponding to a touch gesture at a time t+k.

Also, if the diagonal-line length D is greater than the threshold diagonal-line length $D_{th2}$ for multi-touch and a variation in the diagonal-line length D exceeds the second threshold variation value $\Delta D_{th2}$, the gesture recognition unit 122 may recognize the corresponding gesture as a spreading in and out gesture corresponding to the state where a plurality of fingers of both hands of a user touch the screen. In FIG. 4D, a bounding box 440 represents a bounding box corresponding to a touch gesture at a time t, and a bounding box 442 represents a bounding box corresponding to a touch gesture at a time t+k. Here, threshold diagonal-line lengths, threshold diagonal-line variation values, variations in center point locations, etc., for gesture recognition may be experimentally determined.

The recognition algorithm according to this embodiment can be driven in low-cost microcontrollers since it follows a much simpler rule than any other touch gesture recognition methods while avoiding confusion between single-touch gestures and multi-touch gestures. However, in order to apply the recognition algorithm according to the current embodiment, there is also a desire to lower the possibility of erroneous touch gesture recognition.

For example, it is assumed that a user tries to make a multi-touch scroll gesture with four fingers as shown in FIG. 4D. In actual cases, there is high possibility that the user's fingers would touch a touch screen/pad non-simultaneously, i.e., there might be a slight difference in the time of contact of the fingers. That is, when the user touches a touch screen with his or her fingers at unintentionally intermittent times, intending to make a multi-touch gesture, the touch gesture may be recognized as a single-touch gesture if the touch gesture is determined based on sensing information acquired when the user's first finger contacts the touch screen.

That is, in the case of a multi-touch gesture, determining a touch gesture when a touch initially occurs may cause erroneous recognition. According to one or more embodiments, in order to avoid such erroneous recognition, the determining of a touch gesture may not be performed using a touch signal generated at a specific time but by using touch signals collected for a predetermined time period. Also, in order to avoid erroneous recognition, discontinuous touch signals, as shown in FIGS. 5A and 5B, have to be taken into account.

Figure 5A:
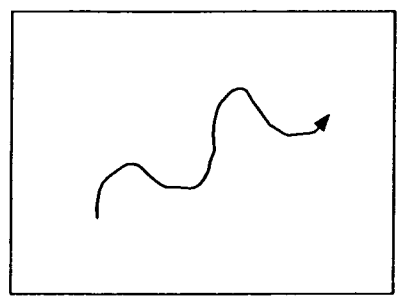
FIGS. 5A through 5B are views for explaining an example in which a touch sensor system malfunctions.
Figure 5B:
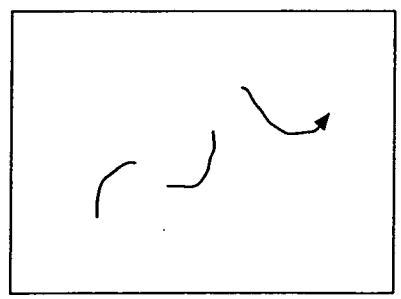

FIGS. 5A through 5B illustrate an example in which a touch sensor system malfunctions.

There is the case where when a user tries to make a scroll operation illustrated in FIG. 5A, no touch is sensed at certain parts on the user's intended scroll line, as illustrated in FIG. 5B, due to causes such as the low sensitivity of the sensor system, the user's carelessness, etc., In this case, erroneous gesture recognition may occur at the discontinuous areas if the touch gesture recognition algorithm is executed to determine touch gestures in very short time intervals.

According to one or more embodiments, the gesture recognition unit 122 (see FIG. 1) recognizes a gesture based on information about touch locations collected for an initial determination time for gesture recognition. Also, the gesture recognition unit 122 maintains the gesture recognized based on the information about touch locations collected for the initial determination time until it is determined that the touch is completely released since no touch is detected for a threshold touch-release time.

Figure 6:
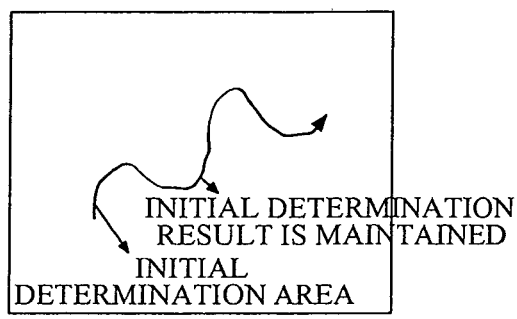
FIG. 6 is a view for explaining a touch gesture recognition process robust to malfunctions of a touch sensor, according to one or more embodiments.

FIG. 6 is a view for explaining a touch gesture recognition process robust to malfunctions of a touch sensor, according to one or more embodiments.

If a touch gesture is recognized based on data collected for a predetermined time period after a touch is sensed and the result of the recognition is maintained until the user takes his or her finger(s) off the touch sensor system, a touch result shown in FIG. 6 including the result of touch recognition for locations where no touch has been sensed can be obtained. Accordingly, a touch gesture recognition process robust to malfunctions of a touch sensor can be provided.

Meanwhile, if the diagonal-line length of a bounding box is longer than the threshold diagonal-line length for multi-touch even when the initial determination time has not elapsed, that is, when the bounding box is larger than a bounding box to be determined as a multi-touch scroll as well as that of a bounding box to be determined as a single-touch scroll, the gesture recognition unit 122 may recognize the gesture as a spreading in and out gesture.

Figure 7:
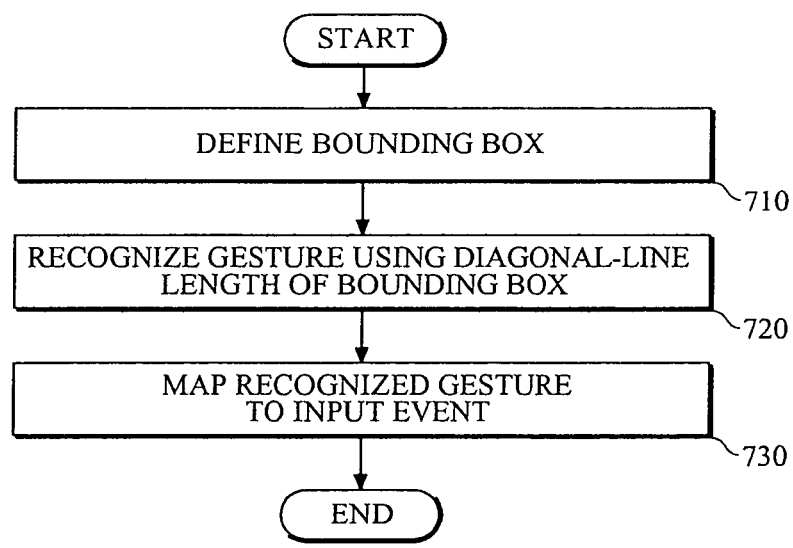
FIG. 7 is a flowchart of a touch gesture recognition method, according to one or more embodiments.

FIG. 7 is a flowchart of a touch gesture recognition method, according to one or more embodiments.

First, a bounding box surrounding at least one touch location where a touch occurs is defined (operation 710). Then, a gesture is recognized using the diagonal-line length of the bounding box (operation 720).

Here, a box including a minimum point Pmin having the smallest X-axis and Y-axis coordinate values and a maximum point Pmax having the greatest X-axis and Y-axis coordinate values on a 2-dimensional coordinate system in at least one touch location is determined to be the bounding box, and the distance between the Pmin and Pmax is determined to be the diagonal-line length of the bounding box. A gesture may be recognized depending on the diagonal-line length, variations in the diagonal-line length, or variations in the location of the center point of the bounding box, using the touch gesture recognition method described above with reference to FIG. 2.

The recognized gesture is mapped to a user input event of an input device supportable by the touch gesture recognition apparatus (operation 730). Then, the execution result of the mapped input event is displayed on a display. The touch gesture recognition method may be applied to both single-touch screens and multi-touch screens.

Figure 8:
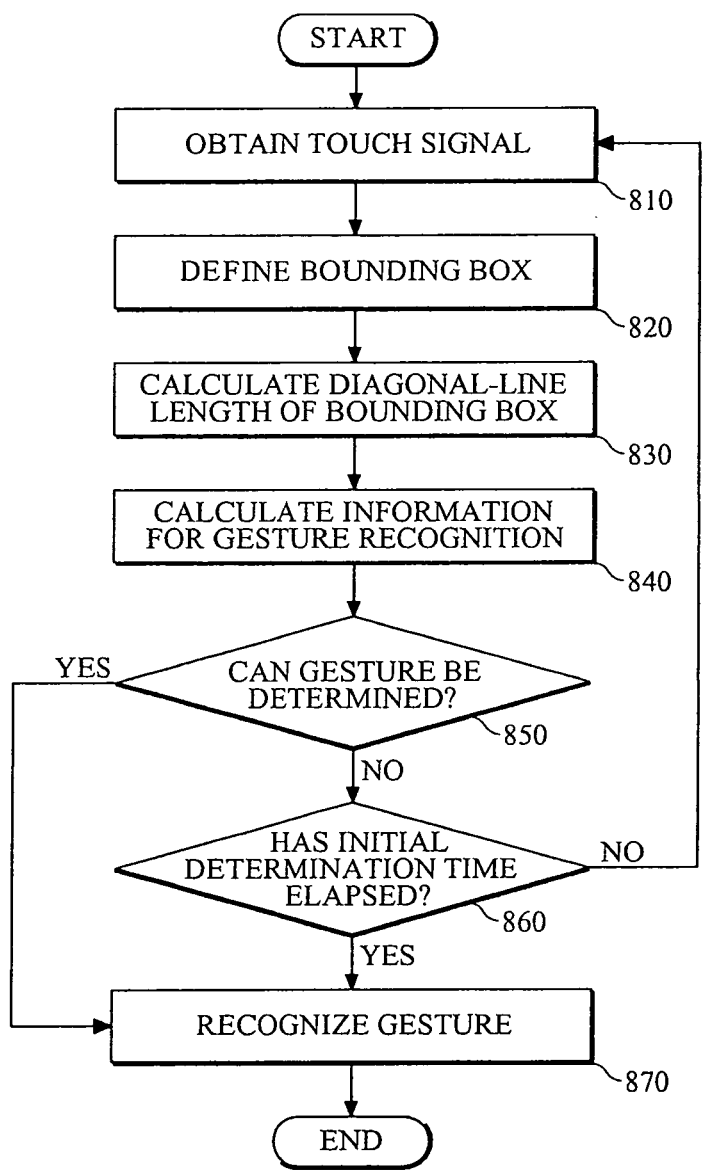
FIG. 8 is a flowchart of a method for touch gesture recognition for an initial determination time, according to one or more embodiments.

FIG. 8 is a flowchart of a method for touch gesture recognition for an initial determination time, according to one or more embodiments.

If the touch gesture recognition apparatus 100 (see FIG. 1) acquires a touch signal (operation 810), the touch gesture recognition apparatus 100 defines a bounding box using location information of the touch signal (operation 820). Then, the touch gesture recognition apparatus 100 calculates the diagonal-line length of the bounding box (operation 830). Also, the touch gesture recognition apparatus 100 calculates a variation in the diagonal-line of the bounding box as information for gesture recognition (operation 840). In addition, the touch gesture recognition apparatus 100 may detect a variation in the location of the center point of the bounding box in operation 830.

Then, if a gesture corresponding to the touch signal is a gesture such as a spreading in and out gesture which can be determined by a gesture recognition algorithm even when an initial determination time has not elapsed (operation 850), the gesture is recognized (operation 870).

If the gesture cannot be determined, it is determined whether the initial determination time has elapsed (operation 860). If the initial determination time has not elapsed, the process returns to operation 810 to continue to collect touch location information. If the initial determination time has elapsed, the gesture is recognized based on the collected touch location information.

One or more embodiments of the present invention can include computer readable media including computer readable code to control at least one processing device to implement one or more embodiments. The computer readable medium includes all types of recording media in which computer readable data and code are stored. Examples of the computer readable medium include a ROM, a RAM, a CD-ROM, a magnetic tape, a floppy disk, and an optical data storage. In addition, the computer readable medium may be a distributed computer system network, in which the computer readable code may be stored and executed in a distributed manner.

A number of embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

Accordingly, while aspects of the present invention has been particularly shown and described with reference to differing embodiments thereof, it should be understood that these embodiments should be considered in a descriptive sense only and not for purposes of limitation. Descriptions of features or aspects within each embodiment should typically be considered as available for other similar features or aspects in the remaining embodiments.

Thus, although a few embodiments have been shown and described, with additional embodiments being equally available, it would be appreciated by those skilled in the art that changes may be made in these embodiments without departing from the principles and spirit of the invention, the scope of which is defined in the claims and their equivalents.

What is claimed is:

1. A touch gesture recognition apparatus comprising:
a gesture recognizing unit configured
to detect a touch thereon, to create a bounding box surrounding a location where the touch occurs,
to determine a calculated distance to be a length of the diagonal line of the bounding box,
to recognize a gesture as a single-touch gesture or a multi-touch gesture by comparing the determined length of the diagonal line of the bounding box with a range of a threshold diagonal-line length, and
to distinguish between the single-touch gesture and the multi-touch gesture touched consecutively using touch signals collected for a predetermined time period; and
an input event processing unit configured to map the recognized gesture to a user input event.

2. The touch gesture recognition apparatus of claim 1, wherein the gesture recognizing unit is further configured to calculate a distance between a minimal point having a smallest x-axis value and a smallest y-axis value and a maximal point having a greatest x-axis value and a greatest y-axis value on a 2-dimensional coordinate system within the location where the touch occurs.

3. The touch gesture recognition apparatus of claim 1, wherein the gesture recognizing unit recognizes the gesture using a determined variation in the diagonal line length in addition to using the diagonal line length.

4. The touch gesture recognition apparatus of claim 3, wherein the gesture recognizing unit recognizes the gesture to be a 2-finger pinching gesture when a determined variation in the diagonal-line length of the bounding box exceeds a first threshold change amount.

5. The touch gesture recognition apparatus of claim 3, wherein the gesture recognizing unit recognizes the gesture to be a spreading in and out gesture when the diagonal-line length is determined to be longer than a threshold diagonal-line length for multi-touch and a determined variation in the diagonal-line length of the bounding box exceeds a second threshold change amount.

6. The touch gesture recognition apparatus of claim 1, wherein the gesture recognizing unit recognizes, when the diagonal-line length is determined to be less than a threshold diagonal-line length for single-touch, the gesture as the single-touch gesture.

7. The touch gesture recognition apparatus of claim 1, wherein the gesture recognizing unit recognizes, when the diagonal-line length is determined to be longer than a threshold diagonal-line length for single-touch and less than a threshold diagonal-line length for multi-touch which is longer than the threshold diagonal-line length for single-touch, the gesture as the multi-touch gesture.

8. The touch gesture recognition apparatus of claim 1, wherein when recognizing the gesture to be one of the single-touch gesture and the multi-touch gesture, the gesture recognizing unit determines whether a determined variation in a location of a center point of the bounding box exceeds a predetermined threshold value, and recognizes the gesture as one of a single-touch scroll and a multi-touch scroll if the determined variation in the location of the center point of the bounding box exceeds the predetermined threshold value.

9. The touch gesture recognition apparatus of claim 1, wherein the input event processing unit maps the recognized gesture to at least one input event corresponding to at least one of a pressing of a left mouse button, pressing of a right mouse button, moving of a mouse cursor, rotation of a scroll wheel, release of a left mouse button, and release of a right button.

10. The touch gesture recognition apparatus of claim 1, further comprising a display to provide a user interface screen, wherein the input event processing unit executes the mapped user input event and outputs a result of the execution on the user interface screen.

11. A touch gesture recognition method comprising:
recognizing a touch, creating a bounding box surrounding a location where the touch occurs;
determining a calculated distance to be a length of the diagonal line of the bounding box;
recognizing a gesture as a single-touch gesture or a multi-touch gesture by comparing the determined length of the diagonal line of the bounding box with a range of a threshold diagonal-line length;
distinguishing between the single-touch gesture and the multi-touch gesture touched consecutively using touch signals collected for a predetermined time period; and
mapping the recognized gesture to a user input event.

12. The touch gesture recognition method of claim 11, wherein the recognizing of the gesture comprises calculating a distance between a minimal point having a smallest x-axis value and a smallest y-axis value and a maximal point having a greatest x-axis value and a greatest y-axis value on a 2-dimensional coordinate system within the location where the touch occurs.

13. The touch gesture recognition method of claim 11, wherein the recognizing of the gesture comprises recognizing the gesture using a determined variation in the diagonal-line length in addition to using the diagonal line length.

14. The touch gesture recognition method of claim 13, wherein the recognizing of the gesture comprises recognizes the gesture as a 2-finger pinching gesture, when a determined variation in a location of a center point of the bounding box is less than a predetermined threshold value and a determined variation in the diagonal-line length of the bounding box exceeds a first threshold change amount.

15. The touch gesture recognition method of claim 13, wherein the recognizing of the gesture comprises recognizing the gesture as a spreading in and out gesture when the diagonal-line length is determined to be longer than a threshold diagonal-line length for multi-touch and a determined variation in the diagonal-line length of the bounding box exceeds a second threshold change amount.

16. The touch gesture recognition method of claim 11, wherein the recognizing of the gesture comprises recognizing the gesture as a single-touch scroll gesture when the diagonal-line length is determined to be less than a threshold diagonal-line length for single-touch and a determined variation in a location of a center point of the bounding box exceeds a predetermined threshold value.

17. The touch gesture recognition method of claim 11, wherein the recognizing of the gesture comprises recognizing the gesture as a multi-touch scroll gesture, when the diagonal-line length is determined to be longer than a threshold diagonal-line length for single-touch and less than a threshold diagonal-line length which is longer than the threshold diagonal-line length for single-touch, and a determined variation in a location of a center point of the bounding box exceeds a predetermined threshold value.

18. The touch gesture recognition apparatus of claim 1, wherein the gesture recognizing unit creates the bounding box based on touch location information collected for an initial determination time for gesture recognition, and recognizes the gesture using the diagonal-line length of the bounding box.

19. The touch gesture recognition apparatus of claim 18, wherein the gesture recognizing unit maintains the gesture, recognized based on the touch location information collected for the initial determination time for gesture recognition, until it is determined that the touch has been released with the touch not being detected for a time longer than a threshold touch release time.

20. The touch gesture recognition apparatus of claim 18, wherein the gesture recognizing unit recognizes the gesture as a spreading in and out gesture when the diagonal-line length of the bounding box is determined to be longer than a threshold diagonal-line length for multi-touch which is a reference value to determine the multi-touch gesture when the initial determination time has not elapsed.

* * * * *